UNITED STATES PATENT OFFICE.

SOLOMON KUTNER, OF CHICAGO, ILLINOIS, ASSIGNOR, BY MESNE ASSIGNMENTS, TO RAPID ROLLER CO., OF CHICAGO, ILLINOIS, A CORPORATION OF ILLINOIS.

ART OF MANUFACTURING PRINTERS' ROLLERS.

1,397,528.   Specification of Letters Patent.   Patented Nov. 22, 1921.

No Drawing.   Application filed April 11, 1919. Serial No. 289,327.

*To all whom it may concern:*

Be it known that I, SOLOMON KUTNER, a citizen of the United States, and a resident of the city of Chicago, in the county of Cook and State of Illinois, have invented a certain new and useful Improvement in the Art of Manufacturing Printers' Rollers; and I do hereby declare that the following description of my said invention forms a full, clear, and exact specification which will enable others skilled in the art to which it appertains to make and use the same.

My invention relates generally to improvements in the art of manufacturing printers' rollers; and it consists, essentially, in the novel and peculiar combinataion of parts and details of construction, as hereinafter first fully set forth and described and then pointed out in the claim.

The object of this invention is the production of a highly efficient and serviceable printer's roller, and the novel and peculiar method of producing such a roller.

It is a well-recognized fact that printers' rollers as now manufactured are subject to changes when exposed to varying atmospheric conditions, and that printers' rollers suitable for use during the colder season of the year, are not suitable for employment during the more temperate season, and vice versa, thus requiring changing the rollers when passing from one season to the other. It is, furthermore, a fact that the composition now used in these rollers sooner or later hardens to such an extent, as to render the roller useless owing to its lack of resiliency thereby requiring renewal, the expense of which is quite considerable.

I have been experimenting for some time to produce a printer's roller which is free from these defects as far as it is possible so to do, and have discovered a composition for such a roller, and a method of treating this composition, which produces a printing roller of the highest degree of resiliency and elasticity, which will not harden in course of time, and which can be used over and over again when desired or required, at a slight expense for recasting the roller.

In order to produce these rollers which, it is well known, are used in enormous quantities, and in the manufacture of which many millions of dollars are invested, I proceed, as follows:

I first produce a core for the roller which I make from a stock composition which can be made in large quantities and stored for subsequent further treatment and use, which stock composition consists, approximately of 800 parts of a vegetable oil, such as corn oil, linseed oil, blown rape seed oil and the like, 15 parts of calcium oxid,
12 parts of mineral oil, and
100 parts of sulfuric chlorid.

I first mix the oils and the calcium oxid in a suitable vessel under a temperature of approximately 85 degrees Fah., the vessel being preferably a jacketed kettle containing water in the jacket, and then add, preferably drop by drop, the sulfuric chlorid under agitation of the mass to perfect the liberation of chlorid gases, which will thereby turn the composition into a viscous mass. This mass I then transfer into a storage tank in which it is slowly agitated for about 24 hours, to eliminate therefrom any air bubbles that may have gathered therein. This stock composition can be stored for a long time without having any deleterious effect upon the same.

When required for use in making the rollers, I proceed, as follows:

I take from this stock composition, approximately 100 parts stock composition, and slowly add thereto under agitation, 10 parts of sulfuric chlorid, for several minutes and then pour this mixture into the usual molds, the interior of which has been coated with a film of either glycerin, mineral oil, boiled starch, or the like, and allow the mass to solidify, which it will usually do in from 15 to 40 minutes. The object of adding the sulfuric chlorid to the stock composition is to cause a partial vulcanization of the oil.

The article thus far described constitutes the core, or main part of the roller, and is approximately ¼ of an inch smaller in diameter than the finished roller. I then cover this core with a thin coating of the composition which is now being used for printers' rollers, which composition, however, is liable to harden, but the coating of this composition is so thin, while the core is so extremely resilient and elastic, that this hardening does not appreciably affect the resiliency and elasticity of the roller as a whole.

The covering of the core is applied thereto by placing the core in an apparatus, such as is now employed for producing the present printers' rollers, and which is technically known as a Gattling gun, and contains in the barrels therein the said covering material. The core is ejected from this apparatus through an orifice therein which has the exact external diameter of the finished roller, whereby the coating is caused to tenaciously attach itself to the core and become, for all intents and purposes, an integral part thereof.

When removed from the coating apparatus, the cylinder, which now constitutes the printing roller proper, is exceedingly elastic, resilient, perfectly free from imperfections or cavities such as air bubbles, and will readily take the printers' inks.

Having thus fully described this invention, I claim—

The herein described method of producing material for cores of printers' rollers which consists in mixing substantially 800 parts by weight of a vegetable oil, 15 parts by weight of calcium oxid, 12 parts by weight of a mineral oil, and 100 parts by weight of sulfur chlorid, agitating the mixture and allowing the same to cool, the agitation permitting the escape from the mixture of the occluded gases, and resulting in a viscous liquid; then adding to 100 parts by weight of the result of the first step ten parts by weight of sulfur chlorid gradually adding the sulfur chlorid and agitating the mixture as the sulfur chlorid is added, then while the mixture is still heated pouring the mixture into a suitable mold for the production of the product desired such as the core of a printer's roller.

In testimony that I claim the foregoing as my invention, I have hereunto set my hand.

SOLOMON KUTNER.